(12) United States Patent
Reis et al.

(10) Patent No.: US 10,658,684 B2
(45) Date of Patent: May 19, 2020

(54) SANBORNITE-BASED GLASS-CERAMIC SEAL FOR HIGH-TEMPERATURE APPLICATIONS

(71) Applicant: SAINT-GOBAIN CERAMICS & PLASTICS, INC., Worcester, MA (US)

(72) Inventors: Signo T. Reis, Rolla, MO (US); Matthieu Jérôme Schwartz, Bordeaux (FR); Morteza Zandi, Webster, MA (US); Yeshwanth Narendar, Westford, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 768 days.

(21) Appl. No.: 15/175,866

(22) Filed: Jun. 7, 2016

(65) Prior Publication Data

US 2016/0365586 A1 Dec. 15, 2016

Related U.S. Application Data

(63) Continuation of application No. 14/229,118, filed on Mar. 28, 2014, now abandoned.

(Continued)

(51) Int. Cl.
*H01M 8/0282* (2016.01)
*H01M 8/0276* (2016.01)
(Continued)

(52) U.S. Cl.
CPC ........ *H01M 8/0282* (2013.01); *C03C 3/085* (2013.01); *C03C 8/02* (2013.01); *C03C 8/24* (2013.01);
(Continued)

(58) Field of Classification Search
CPC .................................................. H01M 8/0282
See application file for complete search history.

(56) References Cited

U.S. PATENT DOCUMENTS 3,282,711 A 11/1966 Lin
3,331,731 A 7/1967 Baak
(Continued)

FOREIGN PATENT DOCUMENTS

BR 2012015974-7 12/2012
CN 1649186 A 8/2005
(Continued)

OTHER PUBLICATIONS

"Glass Engineering Handbook" Mclelland and Shand. 3rd edition. 1985 McGraw-Hill, pp. 4-4 to 4-9.
(Continued)

*Primary Examiner* — Brian R Ohara
(74) *Attorney, Agent, or Firm* — Abel Schillinger, LLP; Thomas H Osborn

(57) ABSTRACT

A glass-ceramic seal for ionic transport devices such as solid oxide fuel cell stacks or oxygen transport membrane applications. Preferred embodiments of the present invention comprise glass-ceramic sealant material based on a Barium-Aluminum-Silica system, which exhibits a high enough coefficient of thermal expansion to closely match the overall CTE of a SOFC cell/stack (preferably from about 11 to 12.8 ppm/° C.), good sintering behavior, and a very low residual glass phase (which contributes to the stability of the seal).

20 Claims, 5 Drawing Sheets

Related U.S. Application Data

(60) Provisional application No. 61/836,234, filed on Jun. 18, 2013, provisional application No. 61/806,769, filed on Mar. 29, 2013.

(51) Int. Cl.
| | |
|---|---|
| H01M 8/0286 | (2016.01) |
| H01M 8/1016 | (2016.01) |
| H01M 8/124 | (2016.01) |
| C03C 3/085 | (2006.01) |
| C03C 8/02 | (2006.01) |
| C03C 8/24 | (2006.01) |
| C03C 10/00 | (2006.01) |
| C04B 41/50 | (2006.01) |
| C04B 41/86 | (2006.01) |

(52) U.S. Cl.
CPC ...... *C03C 10/0009* (2013.01); *C03C 10/0036* (2013.01); *C04B 41/5023* (2013.01); *C04B 41/86* (2013.01); *H01M 8/0276* (2013.01); *H01M 8/0286* (2013.01); *H01M 8/1016* (2013.01); *C03C 2204/00* (2013.01); *C03C 2209/00* (2013.01); *H01M 2008/1293* (2013.01); *H01M 2300/0071* (2013.01); *Y10T 428/26* (2015.01)

(56) References Cited

U.S. PATENT DOCUMENTS

| | | | |
|---|---|---|---|
| 3,578,470 A | 5/1971 | Bahat et al. | |
| 3,809,543 A | 5/1974 | Gaskell et al. | |
| 4,634,683 A | 1/1987 | Dumbaugh, Jr. | |
| 4,634,684 A | 1/1987 | Dumbaugh, Jr. | |
| 5,250,360 A | 10/1993 | Andrus et al. | |
| 5,256,469 A | 10/1993 | Cherukuri et al. | |
| 5,807,642 A | 9/1998 | Xue et al. | |
| 6,228,469 B1 | 5/2001 | Grossman et al. | |
| 6,388,375 B1 | 5/2002 | Pinckney et al. | |
| 6,430,966 B1 | 8/2002 | Meinhardt et al. | |
| 6,532,769 B1 | 3/2003 | Meinhardt et al. | |
| 6,656,625 B1 | 12/2003 | Thompson et al. | |
| 7,456,331 B2 * | 11/2008 | Kulichikhin | A61L 15/585 424/447 |
| 7,883,571 B1 | 2/2011 | Lane et al. | |
| 2005/0130823 A1 | 6/2005 | Budd | |
| 2005/0147866 A1 | 7/2005 | Ko et al. | |
| 2005/0252503 A1 * | 11/2005 | Siebers | C03C 10/0036 126/1 R |
| 2008/0131739 A1 | 6/2008 | Badding et al. | |
| 2009/0019135 A1 | 1/2009 | Eswaran et al. | |
| 2009/0197135 A1 * | 8/2009 | Querel | H01M 8/0282 429/460 |
| 2010/0038014 A1 * | 2/2010 | Tomeno | H01B 3/087 156/89.14 |
| 2010/0086825 A1 | 4/2010 | Lamberson et al. | |
| 2010/0242715 A1 | 9/2010 | Raichel et al. | |
| 2010/0273632 A1 | 10/2010 | Wang et al. | |
| 2011/0200909 A1 * | 8/2011 | Parihar | H01M 8/1246 429/469 |
| 2011/0312482 A1 * | 12/2011 | Goedeke | C03C 3/064 501/15 |
| 2012/0065049 A1 | 3/2012 | Goedeke et al. | |
| 2013/0101645 A1 * | 4/2013 | Scruggs | A61K 45/06 424/400 |
| 2014/0295313 A1 | 10/2014 | Reis et al. | |
| 2016/0096771 A1 | 4/2016 | Schwartz et al. | |

FOREIGN PATENT DOCUMENTS

| | | |
|---|---|---|
| CN | 102763260 A | 10/2012 |
| CN | 103819087 A | 5/2014 |
| CN | 105103352 A | 11/2015 |
| CN | 105174719 A | 12/2015 |
| CN | 107108315 A | 8/2017 |
| DE | 295825 A5 | 11/1991 |
| DE | 102005002435 A1 | 7/2006 |
| EP | 2519990 | 11/2012 |
| EP | 2979319 | 2/2016 |
| IL | 220638 | 11/2010 |
| JP | 2002167265 A | 6/2002 |
| JP | 2003506304 A | 2/2003 |
| JP | 2006056769 A | 3/2006 |
| JP | 2010524193 A | 7/2010 |
| JP | 2012162445 A | 8/2012 |
| JP | 2012174674 A | 9/2012 |
| JP | 2013516378 A | 5/2013 |
| JP | 5503017 | 5/2014 |
| JP | 6116037 B2 | 4/2017 |
| KR | 1987-0003944 A | 5/1987 |
| KR | 1987-0003945 A | 5/1987 |
| KR | 19990049582 A | 7/1999 |
| KR | 20120094518 | 8/2012 |
| KR | 1020150132489 | 11/2015 |
| WO | 2007001360 A2 | 1/2007 |
| WO | 2008127565 A2 | 10/2008 |
| WO | 2011081736 A2 | 7/2011 |
| WO | 2014160948 | 10/2014 |
| WO | 2016053750 A1 | 4/2016 |

OTHER PUBLICATIONS

International Search Report for PCT/US2015/051952, dated Jan. 19, 2016, 14 pages.

Reis, S.T. et al., "Crystallization and Processing of SOFC Sealing Glasses", Journal of Non-Crystalline Solids 356 (2010), pp. 3009-3012.

Lessing, P.A. et al., "Sealants", CRC Press, New York, 2009, 25 pages.

Wilson, Jamie et al., "OTM Based Oxy-Fuel Combustion for CO2 Capture", Eric Eddings and Joseph Adams, University of Utah, Salt Lake City, UT 84112, 2008, 12 pages.

Kerstan, Marita et al., "Barium Silicates as High Thermal Expansion Seals for Solid Oxide Fuel Cells Studied by Bigh-Temperature X-Ray Diffraction (HT-XRD)", Journal of Power Sources 196 (2011), pp. 7578-7584.

Drummond III, Charles H., "Crystallization Behavior and Properties of BaO • Al2O3 • 2SiO2 Glass Matrices", NASA Contractor Report, Feb. 1990, 24 pages.

Bansal, Narottam P. et al., "Crystallization and Properties of Sr—Ba Aluminosilicate Glass-Ceramic Matrices", NASA Technical Memorandum 103764, Jan. 1991, 24 pages.

Ohring, Milton, "The Materials Science of Thin Films", Academic Press Limited, London, 1992, 3 pages.

Allameh, Seyed M., "Synthesis of Celsian (BaAl2Si2O8) from Solid Ba—Al—Al2O3—SiO2 Precursors: I, XRD and SEM/EDX Analyses of Phase Evolution", Journal of the American Ceramic Society, vol. 80, No. 12, 1997, pp. 3109-3126.

Krzmanc, Marjeta Macek et al., "The Synthesis and Microwave Dielectric Properties of SrxBa1—xAl2Si2O8 and CayBa1—yAl2Si2O8 Ceramics", Journal of the European Ceramic Society 27 (2007) pp. 1181-1185.

Lara, C. et al., Glass-Forming Ability, Sinterability and Thermal Properties in the Systems RO-BaO-SiO2 (R=Mg, Zn), Journal of Non-Crystalline Solids 348 (2004), pp. 149-155.

Lee, Kuo-Tong et al., "Synthesis of Hexacelsian Barium Aluminosilicate by a Solid-State Process", Journal of the American Ceramic Society, vol. 83, No. 12, (2000), pp. 2907-2912.

Dahl, Paul Inge et al., "Oxygen Transport Membranes BIGCO2 Achievement", SINTEF Materials and Chemistry, Trondheim CCS Conference, Jun. 15, 2011, 21 pages.

International Search Report for PCT/US2010/056859, dated Aug. 2, 2011, 10 pages.

Non-Final Office Action for U.S. Appl. No. 12/947,407, dated Jul. 11, 2013, 20 pages.

Final Office Action for U.S. Appl. No. 12/947,407, dated Nov. 25, 2013, 15 pages.

(56) References Cited

OTHER PUBLICATIONS

International Search Report for PCT/US2014/032192, dated Aug. 25, 2014, 13 pages.
Extended European Search Report for EP Appliction No. 10841443.4, dated Jul. 3, 2015, 8 pages.

* cited by examiner

SANBORNITE-BASED GLASS-CERAMIC SEAL FOR HIGH-TEMPERATURE APPLICATIONS

CROSS-REFERENCE TO RELATED APPLICATION

This application is a continuation application of and claims priority under 35 U.S.C. § 120 to U.S. patent application Ser. No. 14/229,118, entitled "SANBORNITE-BASED GLASS-CERAMIC SEAL FOR HIGH-TEMPERATURE APPLICATIONS", by Signo T. Reis et al., filed Mar. 28, 2014, which claims priority under 35 U.S.C. § 119(e) to U.S. Patent Application No. 61/806,769, entitled "SANBORNITE-BASED GLASS-CERAMIC SEAL FOR HIGH-TEMPERATURE APPLICATIONS", by Signo T. Reis et al., filed Mar. 29, 2013, and to U.S. Provisional Patent Application No. 61/836,234, entitled "SANBORNITE-BASED GLASS-CERAMIC SEAL FOR HIGH-TEMPERATURE APPLICATIONS", by Signo T. Reis et al., filed Jun. 18, 2013, all of which are assigned to the current assignee hereof and incorporated herein by reference in their entireties.

FIELD OF THE DISCLOSURE

This disclosure, in general, relates to solid oxide fuel cells and, in particular, to an improved glass-ceramic seal for a solid oxide fuel cell stack or oxygen transport membrane applications.

BACKGROUND

A solid oxide fuel cell (SOFC) is a device that generates electricity by a chemical reaction. FIG. 1 shows a conventional SOFC assembly including a plurality of stacked "cells" in which each cell includes an anode layer 102, a cathode layer 104, and an electrolyte layer 106. Fuel cells are typically characterized by their electrolyte material, with SOFCs having a solid oxide or ceramic electrolyte.

During operation of the SOFC, an oxidant, usually air, is fed through a plurality of air channels 108 defined by the cathode 104, while fuel, such as hydrogen gas ($H_2$) is fed through a plurality of fuel channels 110 defined by the anode 102. Typically, the oxidant and fuel channels are oriented at right angles to one another. The anode and cathode layers are separate by an electrolyte layer 106. During operation, the oxidant is reduced to oxygen ions at the cathode. These oxygen ions can then diffuse through the solid oxide electrolyte to the anode, where they can electrochemically oxidize the fuel. In this reaction, a water byproduct is given off as well as two electrons. These electrons are transported through the anode to an external circuit (not shown) and then back to the cathode, providing a source of electrical energy in the external circuit.

The flow of electrons in the external circuit typically provides an electrical potential on the order of approximately one volt. To generate larger voltages, fuel cells are typically arranged in "stacks" composed of a larger number of individual cells with an "interconnect" joining and conducting current through immediately adjacent cells. The stack design of FIG. 1 is a flat-plate or "planar" SOFC, in which three separate "cells" are shown arranged in a repeating sequence. The adjacent cells are separated by an interconnect 112, which serves to connect each cell in series so that the electricity each cell generates can be combined.

Although planar SOFC configurations have a number of advantages over other types of fuel cells, it is challenging to provide adequate sealing to prevent fuel-oxidant mixing and to electrically-insulate the stack. Seal leakage can lead to inefficient device performance (including fuel cell failure), costly device maintenance, and safety related issues. In planar SOFCs, the sealant is in contact with all other components of the cell and thus is subject to stringent requirements. Suitable sealing materials must be non-conducting and be able to function at the very high operating temperatures of SOFCs (typically 800-850° C.) and to withstand both oxidizing and reducing environments as well as reaction gases generated inside the SOFC during operation.

The sealing material must be able to survive extended service at elevated temperatures and repeated thermal cycles. If the sealing material expands at a rate that is different than the thermal expansion rate of the cell components, the sealing material may either crack or cause cracking of the cell components. As a result, the thermal expansion coefficient (CTE) of a seal material and stack components are kept as close as possible to avoid thermal stresses between sealant and cell during the SOFC operation.

Glass-ceramics are among the most promising sealants because, by controlling the crystallization of glasses (i.e., the nature, shape, and volume fraction of crystals), the CTE of the material can be tuned to match the CTEs of the cell components, such as, for example, yttria-stabilized zirconia (YSZ), lanthanum strontium titanate (LST), lanthanum strontium manganite (LSM), and nickel oxide-YSZ composite. Moreover, glass-ceramics exhibit mechanical robustness, long term stability at cell operating temperatures, electrically insulating behavior, good wetting of cell components, and ready application to the surfaces to be sealed as glass-frit powder dispersed in a paste, or as a tape-cast sheet that subsequently is subjected to thermal treatments of sintering and crystallization.

US Pat. App. No. 2011/0200909 by Parihar et al. for "Thin, Fine Grained and Fully Dense Glass-Ceramic Seal for SOFC Stack," which is assigned to the assignee of the present invention, teaches a seal including a Sanbornite ($BaO.2SiO_2$) crystal phase, a Hexacelsian ($BaO.Al_2O_3.2SiO_2$) crystal phase, and a residual glass phase. While increasing the sanbornite content of glass ceramics leads to a consequent increase in CTE, which can be used to provide a good match to a SOFC stack, parent glasses having high sanbornite contents after crystallization do not show optimal sintering behavior, which can result in porous seal layers after thermal treatment (sintering+crystallizing).

Therefore, there is a need for an improved glass-ceramic seal for a solid oxide fuel cell stack.

SUMMARY OF THE INVENTION

The invention generally is directed to a glass-ceramic seal for ionic transport devices such as solid oxide fuel cell stacks or oxygen transport membrane applications. Preferred embodiments of the present invention comprise glass-ceramic sealant material based on a Barium-Aluminum-Silica system, which exhibit a high enough coefficient of thermal expansion to closely match the overall CTE of a SOFC cell/stack (preferably from about 11 to 12.8 ppm/° C.), good sintering behavior, and a very low residual glass phase (which contributes to the stability of the seal).

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The present disclosure may be better understood, and its numerous features and advantages made apparent to those skilled in the art by referencing the accompanying drawings.

The accompanying drawings are not intended to be drawn to scale. In the drawings, each identical or nearly identical component that is illustrated in various figures is represented by a like numeral. For purposes of clarity, not every component may be labeled in every drawing.

DESCRIPTION OF THE DRAWINGS

Figure 1:
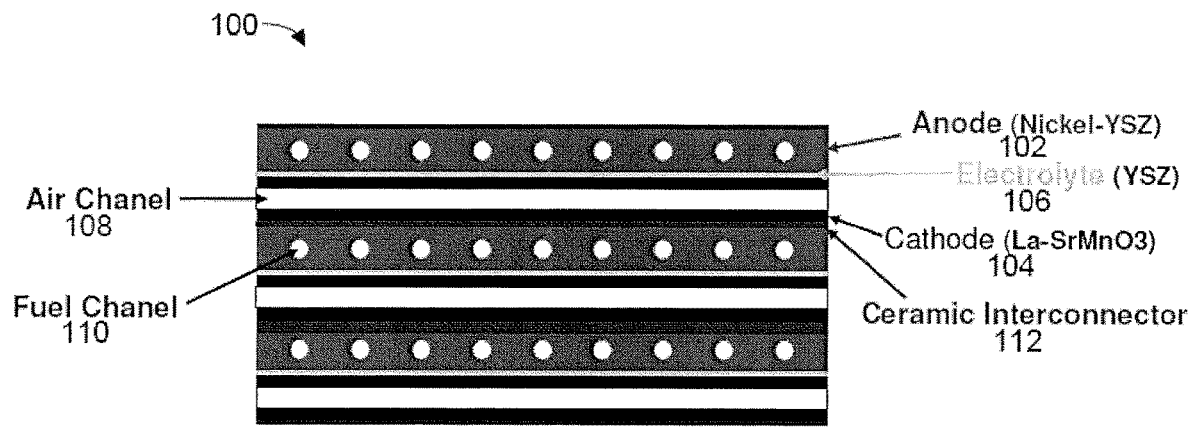
FIG. 1 shows a conventional SOFC assembly including a plurality of stacked "cells."

Embodiments of the present invention can be used in an ionic transport device such as a solid oxide fuel cell (SOFC) system. SOFCs offer the potential of high efficiency electricity generation, with low emissions and low noise operation. They are also seen as offering a favorable combination of electrical efficiency, co-generation efficiency and fuel processing simplicity. One example of a use for SOFCs is in a home or other building. The SOFC can use the same fuel that is used to heat the home, such as natural gas. The SOFC system can run for extended periods of time to generate electricity to power the home and if excess amounts are generated, the excess can be sold to the electric grid. Also, the heat generated in the SOFC system can be used to provide hot water for the home. SOFCs can be particularly useful in areas where electric service is unreliable or non-existent.

The glass ceramic seal in a solid oxide fuel cell (SOFC) is intended to provide a robust, hermetic seal between the frame of the fuel cell and the electrolyte contained in the fuel cell. The sealing material must be able to survive extended service at elevated temperatures (typically 800-850° C.), repeated thermal cycles during operation, in oxidizing and reducing atmospheres, and contact with reaction gases generated inside the SOFC during operation (including $H_2$, CO, $CO_2$, $H_2O$, $CH_x$, $NO_x$, $SO_x$).

If the CTE of the sealing material is too far from that of the SOFC cell/stack components, the sealing material may either crack or generate cracks in the cell/stack components. Such cracking may occur both during the sealing process, i.e. the thermal treatment (sintering and crystallization) of the seal material on the SOFC cell/stack taking place before operation, and during thermal cycling associated with the operation of the fuel cell/stack. Regarding the latter, cracking of the cell/stack or of the sealant in operation may occur both in short and in long terms (i.e. during the first heating to operating conditions or stable temperature during operation, or during cooling/re-heating after a shutdown of the SOFC installation). Failures experienced by the sealing material or the SOFC cell/stack can be attributed, for example, to an excessive thermal expansion mismatch between the sealant and the cell/stacks components or to the use of non-thermally stable sealant on SOFC cell/stacks at SOFC operating conditions.

In order to reduce thermal stresses between the sealant and cell/stack during the SOFC operation or during shutdown and restart operations, the coefficient of thermal expansion (CTE) of the seal material can be tailored to match as much as possible the CTE of the SOFC cell/stack. This can be achieved by modifying the composition of the sealant. A common solutions is to design a glass-ceramic seal with a CTE that closely matches the overall CTE of the SOFC cell/stack in order to minimize thermal stress. Although zero thermal stress is generally desirable, it is difficult to maintain a zero thermal stress between the SOFC cell/stack and a seal. For SOFC cells/stacks composed of different layers of ceramic oxides (LSM, Ni-doped YSZ, YSZ); tensile stresses generated among the SOFC cell/stack components themselves are undesirable because ceramic materials do not have very high tensile strength. Given that some thermal stress will typically be present, Applicants have discovered that it is more beneficial to the SOFC cell/stack if the CTE of the seal as compared to the CTE of the SOFC cell/stack results in compression rather than tension. It is thus highly desirable to keep the seal layer under minimal stresses (e.g., having a CTE mismatch between the seal and the stack of greater than 0 ppm/° C.; but not greater than 3 ppm/° C., or even not greater than 1 ppm/° C.) in order to impart beneficial small stresses to the SOFC components.

Embodiments of the present invention provide sealant compositions, and methods of forming such compositions, having very advantageous behaviors, in terms of achieving desired sinterability and CTE, which will contribute to a longer SOFC lifetime by minimizing the thermal stress in SOFC cells/stacks due to CTE mismatch between sealant and the SOFC ceramic components. Sealants according to the present invention can be applied to a variety of ionic transport devices in which a seal is required between high-CTE materials, such as oxygen transport membranes, $H_2$ transport membranes, ceramic membrane reactors, or for use with high-temperature electrolysis.

Preferred embodiments of the present invention can comprise glass-ceramic sealant material based on a Barium-Aluminum-Silica system. As described in greater detail below, such sealant materials can exhibit a high enough coefficient of thermal expansion to closely match the overall CTE of a SOFC cell/stack (preferably from about 11 to 12.8 ppm/° C.), good sintering behavior, and a very low residual glass phase (which contributes to the stability of the seal).

Seal material and methods described herein can also be used to form a bond between two structures, materials, or substrates having a high CTE (for example, greater than about 10 ppm/° C.) in both SOFC and non-SOFC applications. For example, a glass-ceramic seal layer according to the present invention can be used to form a bond between a SOFC stack and a manifold for delivering gas to the stack. Glass-ceramic seal material according to the present invention can also be used to bond a variety of high-CTE materials for non-SOFC applications, including bonding ceramics, metals, metal-ceramics with potential applications in electrochemical systems, structural applications, etc.

According to an embodiment, a sealant of the present invention can be based on the Barium-Alumina-Silica system, which has been found to crystallize in a complex mixture of three phases: a barium silicate phase ($Ba_5Si_8O_{21}$ and $Ba_3Si_5O_{13}$), a hexa-celsian phase (h-$BaO.Al_2O_3.2SiO_2$ or h-$BAS_2$), and a sanbornite phase ($BaO.2SiO_2$ or $BS_2$). These phases respectively have CTEs of around 10 ppm/° C., 8.0 ppm/° C., and 13.0 ppm/° C., respectively. The relative percentages of these phases in the final glass ceramic seal are determined by (1) the parent glass composition and (2) the thermal treatment applied (including both sintering and crystallization). Increasing the sanbornite content of such glass ceramics leads to a consequent increase in CTE, which allows the sealant CTE to be matched to SOFC stack designs having higher average CTEs (for example, an average CTE of 12 to 12.5 ppm/° C.). If the final sanbornite content of the glass ceramic is too high, however, the sintering behavior of the glassy compound will be adversely affected. In preferred embodiments of the present invention, the sanbornite content will range from about 60 vol % to about 90 vol %, more preferably from about 85 vol % to 90 vol %.

Figure 2:
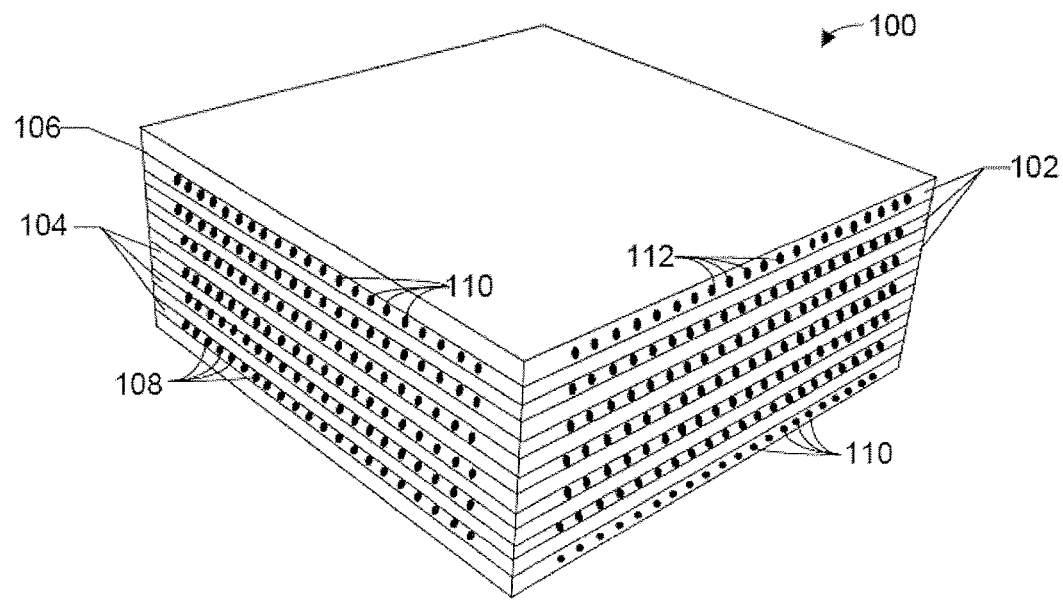
FIG. 2 shows a SOFC assembly coated by a glass-ceramic sealant material according to an embodiment of the present invention.

As described in greater detail below, a glass-ceramic sealant material can be prepared, for example, by melting powder mixtures containing the appropriate amounts, described herein in mol %, of prefired alumina ($Al_2O_3$), barium carbonate ($BaCO_3$), and silica ($SiO_2$). In some preferred embodiments, different starting raw materials could be used, such as barium hydroxide, quartz, wet alumina, etc. The resulting material can be re-solidified and broken down into a glass powder having an average particle size in a range of 0.5 to 10 microns, more preferably from 0.7 to 4 microns, and having a particle size distribution such that d5 is about 5 microns, d50 is about 1 micron, and d90 is about 0.5 microns. The glass powder can be mixed with a binder and a liquid to form slurry and applied then applied by spray to coat the surface of the SOFC stack as shown in FIG. 2. After sealing at an optimum firing condition (described below) the glass-ceramic will bond to the ceramic components to form hermetic seals between the anode, electrolyte, and cathode (which can be formed respectively from Nickel-YSZ, YSZ, and La—$SrMnO_3$-LSM) thus separating the fuel gas from oxygen gas stream with a leak-tight seal.

Preferred embodiments of the present invention comprise a Barium-Alumina-Silica sealant in which the amount of $SiO_2$ present is from about 60 to 65 mol %, preferably from about 62 to 63 mol %, and more preferably about 62.3 mol %. The amount of BaO present is from about 25 to 35 mol %, preferably from about 30 to 32 mol %, and more preferably about 31.2 mol %. The amount of $Al_2O_3$ present is from about 3 to 15 mol %, preferably from about 5 to 10 mol %, and more preferably about 6.5 mol %. The amount of $TiO_2$ and $ZrO_2$ present is from 0 to 4 mol %. The molar ratio of $SiO_2$:BaO preferably is between about 1:1 and about 4:1, more preferably about 2:1. The molar ratio of $SiO_2$:$Al_2O_3$ preferably is between about 1:1 and about 10:1, between about 3:1 and about 6:1, more preferably about 4.8:1.

In conjunction with the thermal cycles described below, embodiments of the present invention can provide stable glass ceramic seals with residual glass below 10%, such as below 5%, below 3%, below 2%, or even below 1%. Moreover, embodiments of the present invention can provide a CTE from about 11 to 12.8 ppm/° C. Such seals are particularly useful for use with oxygen transport membranes (OTMs)—for example, OTMs having a CTE of about 11 ppm/° C.—and with SOFC cells/stacks—for example SOFCs having an average CTE of about 12.0 ppm/° C.

In addition to suitable CTE values, a seal material suitable for SOFC seal applications according to the present invention should also display good sinterability so that it can be used to form non-porous, leak-tight seal. For glass-ceramic materials, there is usually a competition between sintering and crystallization processes during the heat up of the glass compact above the glass transition temperature ($T_g$). The higher the difference between the sintering and crystallization onset temperatures for a given glass powder at a given heating rate, the easier it is to sinter it before crystallization.

Differential scanning calorimetry (DSC) is a widely used technique to identify the occurrence of various thermal events during heating of glass samples, including the glass transition temperature ($T_g$), the glass crystallization onset temperature ($T_x$), and the melting temperature ($T_m$). Sintering of the glass powder starts at a temperature slightly above the glass transition temperature ($T_g$), and slows down considerably at the crystallization onset temperature ($T_x$). A criterion expressed as $\Delta(T_x-T_g)$, therefore, is a good indicator for the sinterability of a glass powder compact of a given composition at a given heating rate.

The glass composition of a preferred embodiment of the invention can have a difference between a glass crystallization temperature ($T_x$) and a glass transition temperature ($T_g$) in a range of between about 100° C. and about 400° C., preferably greater than about 150° C., and more preferably greater than about 160° C., at a heating rate of about 20° C./min.

Another way to determine the sinterability of glass is through the use of the Hrüby Parameter ($K_{gl}=[(T_x-T_g)/(T_m-T_x)]$), which can be determined using thermal characteristics of the glass using DSC analysis as described above. Glasses having higher $K_{gl}$ values have a lower crystallization tendency, which makes them easier to sinter. The seal material of a preferred embodiment of the invention can have a $K_{gl}$ value greater than about 0.4, more preferably greater than about 0.5, or even more preferably greater than about 0.6. In some embodiments, the upper limit for the seal material $K_{gl}$ will be about 0.9.

In one embodiment, the invention is directed to a seal material applied to a ceramic substrate, such as one or more of the ceramic materials used in a typical planar SOFC.

Typical ceramic materials used to form standard SOFCs include NiO and yttria-stabilized zirconia (YSZ) composites (used to form the anode), lanthanum strontium manganite (LSM) (used to form the cathode), YSZ (used to form the electrolyte layer), and lanthanum strontium titanate (LST) (used to form interconnect layers). The CTE values as measured by dilatometric analysis for these materials are listed in Table 1.

TABLE 1

| Material | CTE (ppm/° C.) |
| --- | --- |
| NiO YSZ composite (Anode) | 12.0 to 12.5 |
| LSM (Cathode) | 11.0 to 12.0 |
| YSZ (Electrolyte) | 10.5 |
| LST (Interconnect) | 11.0 to 11.5 |

Glasses suitable for use in sealants according to preferred embodiments of the present invention can be prepared by melting powder mixtures containing the appropriate amounts, described herein in mol %, of prefired alumina ($Al_2O_3$), barium carbonate ($BaCO_3$), and silica ($SiO_2$). The melting can be conducted in joule-heated platinum crucibles at a temperature in a range of between about 1500° C. and about 1600° C. The melts can be allowed to refine for a time period between about one hour and about three hours before being water quenched, resulting in glass frits. The resulting glass frits can be planetary-ball milled and screened to produce a glass powder having an average particle size in a range of 0.5 to 10 microns, more preferably from 0.7 to 4 microns, and having a particle size distribution such that d90 is about 5 microns, d50 is about 1 micron, and d5 is about 0.5 microns.

The particle size distribution (PSD) and specific surface area (SSA) of the resulting powder can be determined using, for example, a Horiba (Horiba Instruments, Inc., Irvine, Calif.) LA920 laser scattering PSD analyzer and a Micromeritics (Micromeritics Instrument Corp., Norcross, Ga.) Tri-Star ASAP 2000 SSA analyzer, respectively.

The glass powder can be mixed with a polymeric binder and an organic solvent to produce a slurry of glass particles. This slurry can then be deposited as a thin layer on a solid oxide ceramic part or other suitable substrate, by various techniques, such as, for example, air spraying, plasma spraying, and screen printing. A preferred technique is air spraying. The coated substrate ("the sample") can then be heated under carefully controlled conditions to sinter and crystallize the glass layer and form a thin, non-porous, highly crystallized, leak-tight seal layer on the substrate.

Heating to sinter and crystallize the seal material is preferably done in a three stage process that adds an intermediate crystallization heating step to the typical two-stage firing process, although in some embodiments a two or even one stage process could be used. Two or more intermediate crystallization heating steps could also be used. The heating stages described herein can be performed by heating the sample, for example an SOFC stack, in a conventional oven or furnace at pressure of less than 3 MPa. In a first step of the three-stage process, the seal material undergoes sintering and densification by heating the coated substrate at a temperature of about 800 to 850° C. for a period of about 2-4 hours.

Next the sample is heated to a temperature of about 895 to 960° C. for a period of about 2-6 hours to allow the seal material to undergo nucleation and crystallization. This intermediate heating stage (the first step in a two-part crystallization process) should be far enough below the melting point (about 1200° C.) of the sealing material that no melting of the seal material takes place. This heating step will cause the formation of a general microstructure of the three phases described above: a barium silicate phase of $Ba_5Si_8O_{21}$ and $Ba_3Si_5O_{13}$ (having a CTE of ~10 ppm/° C.), a hexa-celsian phase of $h-BaO.Al_2O_3.2SiO_2$ or $h-BAS_2$ (having a CTE of ~8 ppm/° C.), and a phase of H-sanbornite $BaO.2SiO_2$ or $BS_2$ (having a CTE of ~13.5 ppm/° C.) Importantly, the barium silicate phase starts to crystalize at 895° C. and the hexa-celsian phase starts to crystalize around 950° C. Moreover, the duration of this intermediate step helps to continue the crystallization of the barium silicate and hexa-celsian phases. Thus, this intermediate crystallization step is important for initiating and nurturing the crystallization of the barium silicate and hexa-celsian phases. It is noted that a heating cycle that omits this intermediate step will likely result in a seal with less density and less crystallization phase percentage in the final seal. Significantly, this crystallization step will primarily proceed through spherulite crystal formation consisting of crystal aggregates of many extremely fine crystals of the monoclinic high temperature sanbornite polymorph (H-sanbornite) showing an irregular structure. In some embodiments, two or more intermediate crystallization heating stages could be used. The intermediate crystallization heating step(s) contributes to greater crystallization phase percentage in the final seal and less residual glass phase percentage.

Finally, the sample can be heated to a temperature of about 1000 to 1100° C. for a period of about 2-8 hours to allow the seal material to undergo microstructural consolidation resulting in the formation of the L-sanbornite polymorph and a progressive increase in the ratio of L-sanbornite to H-sanbornite. At the same time, the ratio of H+L sanbornite to the other phases also shows a progressive increase during this final heating phase while the residual glass percentage is progressively reduced. As a result, the CTE of the seal material is increased significantly. In preferred embodiments, the residual glass percentage can be decreased from 20 vol % to less than 1 vol %, while the CTE is raised from about 10 ppm/° C. to about 12.5 ppm/° C.

The seal coating on the sample can have a thickness after heating in a range of between about 1 microns and about 500 microns at room temperature. In some embodiments, the seal coating on the sample can have a thickness after heating in a range of between about 10 microns and about 250 microns at room temperature. In other embodiments, the seal coating on the sample can have a thickness after heating in a range of between about 20 microns and about 100 microns at room temperature.

Furthermore, the seal thickness can be controlled to suit the specific purpose by building up the thickness of the seal using coat-dry-coat-dry-firing or coat-dry-firing-coat-dry-firing approaches repetitively. A glass slurry coat can be dried and successive coats can be deposited on the dried glass powder repetitively to achieve a desired thickness. For each successive coat, it is preferable to dry the previous coat before applying another coat, and then the multi-coat seal can be fired together in a single heat treatment. Alternatively, additional layers of the seal material can be deposited on top of an already fired seal layer, and the process can be repeated multiple times to achieve a desired seal thickness.

The method can further include removing the binder before sintering the coated sample by heating the sample to a temperature in a range of between about 300° C. and about 500° C. for a time period in a range of between about one hour and about 24 hours.

The smaller the size of the crystals formed during the crystallization step, the better the mechanical properties of the resulting seal. The crystal size is determined by the starting glass composition, which determines the value of $\Delta(T_x-T_g)$, and by the size of the particles of starting glass powder. In preferred embodiments, the majority of the crystals formed are <5 microns in size, more preferably the majority of the crystals formed are <1 microns in size.

Examples

A variety of sample glass powder mixtures were prepared by melting raw material powders, for example by placing them in a Pt—Rh crucible in an electrical oven or Sheffield furnace at temperatures of approximately 1550-1700° C. for 1 to 3 hrs. The glass melt was permanently stirred to ensure appropriate glass homogeneity. After melting, glass was quenched into water to form 0.1-10 m glassy particles. The compositions of the sample glass frits are shown in Table 2.

TABLE 2

|  | SiO2 (mol %) | BaO (mol %) | Al2O3 (mol %) | TiO2 (mol %) | ZrO2 (mol %) | Si/Ba (molar ratio) | Si/Al (molar ratio) |
| --- | --- | --- | --- | --- | --- | --- | --- |
| System A | 63.1 | 31.6 | 5.4 | — | — | 2.0 | 5.9 |
| System B | 62.3 | 31.2 | 6.5 | — | — | 2.0 | 4.8 |
| System C | 61.5 | 30.8 | 7.7 | — | — | 2.0 | 4.0 |
| System D | 64.0 | 32.0 | — | — | 4.0 | 2.0 | 0.0 |
| System E | 64.0 | 32.0 | — | 4.0 | — | 2.0 | 0.0 |
| System F | 64.0 | 32.0 | — | 2.0 | 2.0 | 2.0 | 0.0 |

Differential scanning calorimetry (DSC) measurements were performed from room temperature to 1350° C. using a Netzsch (Netzsch GmbH, Selb, Germany) DSC 404C apparatus at heating rates of about 20 and 5° C./min in Pt—Rh crucibles (heating rate precised for each figure), each sample measurement being preceded by baseline acquisition and sapphire calibration runs. The sintering behavior of the glass fits was studied with a Setaram (SETARAM, Inc., Newark, Calif.) SETSYS thermo-mechanical analyzer (TMA) on heating from room temperature to 1100° C. at 5° C./min, under an argon atmosphere and a 5 g applied load. A baseline correction was applied to the measurements. The glass powder samples were cold pressed using a 7×1×0.8 cm steel die under a 1400 kg load to form bars subsequently submitted to different thermal treatments consisting of 2 hour isotherms at 800, 850, 900, 950, 1000, 1050, and 1100° C. (5° C./min heating and cooling rates).

Thermal analysis by DSC enables determining the temperature of the glass transition ($T_g$), the onset of the glass crystallization reaction ($T_x$), and the melting temperature of the crystalline phases or any endothermic process occurring in the system ($T_m$). The temperature values of those points for Systems A-F are listed in Table 3 below, together with values for $\Delta(T_x-T_g)$ and the Hrüby Parameter ($K_{gl}$) for each sample.

TABLE 3

|  | $T_g$ (° C.) | $T_x$ (° C.) | Tm (° C.) | $\Delta(T_x - T_g)$ | $K_{gl}$ | CIE, Crystalized 100° C. to 850° C. |
| --- | --- | --- | --- | --- | --- | --- |
| System A | 736 | 864 | 1206 | 128 | 0.3721 | 9.6 |
| System B | 746 | 914 | 1184 | 168 | 0.6222 | 10.6 |
| System C | 750 | 923 | 1199 | 173 | 0.6268 | 11.4 |
| System D | 745 | 934 | 1146 | 189 | 0.8632 | 8.9 |
| System E | 757 | 897 | 1166 | 139 | 0.5185 | 9.8 |
| System F | 752 | 897 | 1166 | 145 | 0.5406 | 10.8 |

Thermal expansion measurements were conducted on the glass-ceramics obtained from the glasses of glass systems A-C using the three-stage firing process described above. The CTE values for systems A-C are summarized in Table 5 and Table 6.

TABLE 4

|  | CTE (ppm/° C.) | E (GPa) | ν | d (μm) | Thermal Stress (MPa) |
| --- | --- | --- | --- | --- | --- |
| LSM | 12.0 | 41 | 0.28 |  |  |
| Sample A | 11.4 | 65.0 | 0.35 | 150 | 2.2 |
| System B | 10.6 | 68.0 | 0.29 | 150 | 5.7 |
| System C | 9.6 | 65.0 | 0.34 | 150 | 8.8 |

From the values shown in Tables 2-4, glass system B would seem to be the most desirable for sealing application because glass system B has the highest CTE while also having one of the largest $\Delta(T_x-T_g)$ and $K_{gl}$ values. Glass system B is therefore more likely to match the CTE values for substrates such as SOFCs having CTEs in the 12-12.5 range, while still maintaining good sinterability.

The DSC thermal analysis values shown in Table 3 are listed below in Table 5 for three different formulations of System B having different starting glass powder particle sizes.

TABLE 5

| Particle Size (microns) | $T_g$ (° C.) | $T_x$ (° C.) | Tm (° C.) | $\Delta(T_x - T_g)$ | $K_{gl}$ |
| --- | --- | --- | --- | --- | --- |
| 1.0 | 746 | 914 | 1184 | 168 | 0.62 |
| 45.0 | 739 | 920 | 1189 | 181 | 0.67 |
| 125.0 | 733 | 927 | 1205 | 193 | 0.69 |

A closer examination of glass system B shows the changes in sample properties during the third heating step described above at various temperatures and heating times. Table 6 below first shows the properties for glass system B prepared without the three-step process described herein (using only a two stage firing process). The table then shows the properties for glass system B prepared using the third heating step at a variety of heating parameters (Stage 3). For each different heating profile, the table shows the final CTE value (in ppm/° C.), the standard deviation for the CTE determination (STDEV), and the percentage of residual glass. As shown in Table 6, as the temperature is raised and/or the heating time is increased the amount of crystal phase based on sanbornite in the sample material increases, thus producing an increase in CTE, while at the same time the residual glass percentage decreases.

TABLE 6

| Thermal Treatment | CTE (ppm/° C.) | STDEV | Residual Glass (Vol %) |
|---|---|---|---|
| 2 steps 850° C. 2 h + 960° C. 2 h | 10.6 | 0.1 | 20.9 |
| 2 steps 850° C. 2 h + 1000° C. 4 h | 10.9 | 0.2 | 9.8 |
| 3 steps 850° C. 2 h + 960° C. 2 h + 1000° C. 4 h | 11.7 | 0.1 | 5.9 |
| 2 steps 850° C. 2 h + 1050° C. 2 h | 11.2 | 0.1 | 3 |
| 3 steps 850° C. 2 h + 960° C. 2 h + 1050° C. 2 h | 11.8 | 0.2 | 2 |
| 3 steps 850° C. 2 h + 960° C. 2 h + 1050° C. 4 h | 12.2 | 0.2 | 1 |

Figure 3:
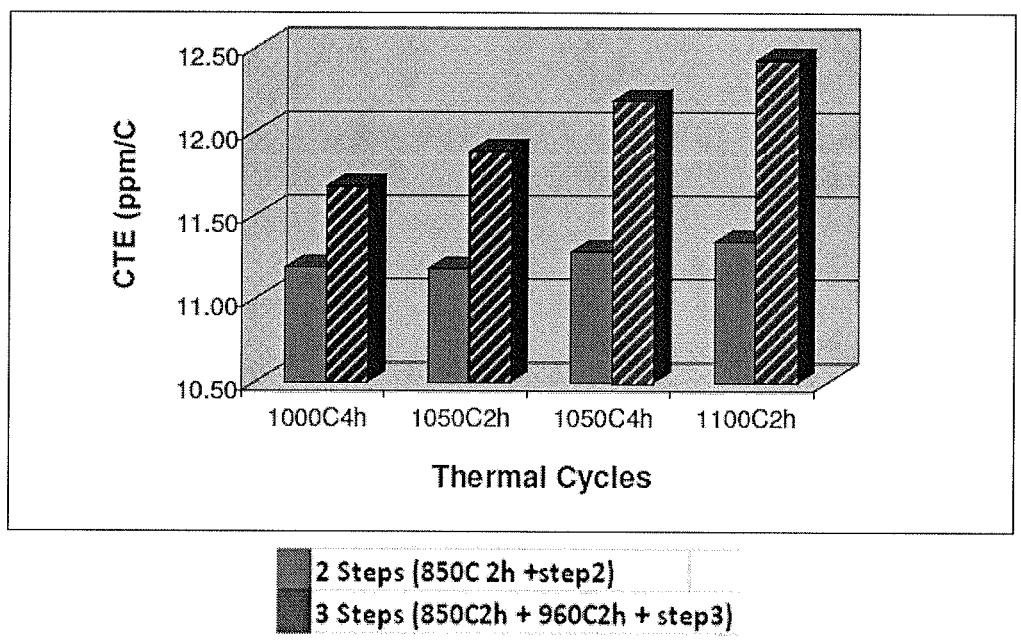
FIG. 3 is a graphical representation of the relationship between various heating profiles and CTE for firing a sealant material according to embodiments of the present invention.

FIG. 3 is a graphical representation of the relationship between the heating process and CTE for the composition of system B. The graph shows CTE values after a final heating step for four different temperature/time profiles. For the samples indicated by the solid color bar (on the left of each pair) the sample was processed using a two-stage firing process, with an initial heating stage in which the sample was heated at 850° C. for two hours followed by the final heating stage shown in FIG. 3. For the samples indicated by the hashed bar (on the right of each pair) the sample was processed using a three-stage firing process, with an initial heating stage in which the sample was heated at 850° C. for two hours, a second stage in which the sample was heated at 960° C. for two hours, followed by the final heating stage shown in FIG. 3. As illustrated in FIG. 3, the three-stage firing process resulted in significantly higher CTE values for the fired sample. Temperatures used for the final heating step (or even for the earlier heating steps) may need to be adjusted depending upon the sample material, thickness, and desired final CTE and crystal fraction.

Figure 4:
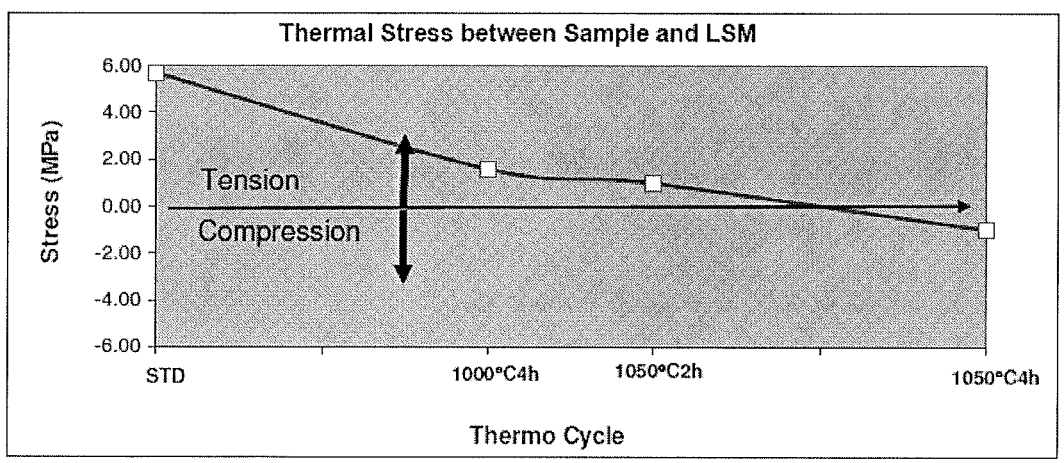
FIG. 4 is a graph showing the thermal stress between a LSM substrate and a sealant material prepared according to an embodiment of the present invention.

FIG. 4 shows a graph of the thermal stress between a LSM substrate and the composition of system B described above fired using a two-stage process (indicated on the x-axis as "STD") and composition B fired using different three-stage heating profiles. As shown in FIG. 4, the third heating profile (1050° C. for 4 hours) results in a seal under compression with thermal stress of about −1 MPa.

Figure 5:
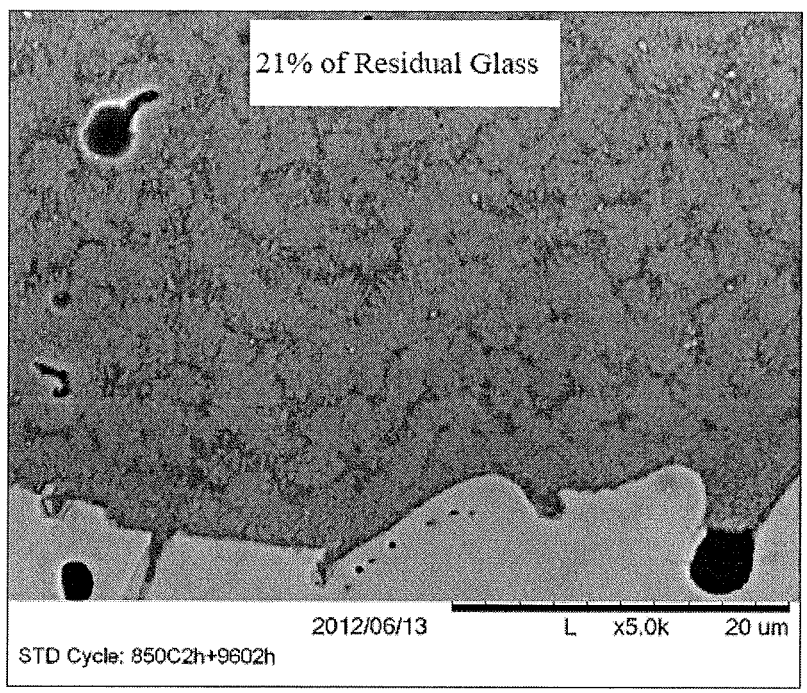
FIG. 5 is an SEM photomicrograph showing a prior art sealant material prepared using a typical two-step firing process resulting in 21% residual glass.
Figure 6:
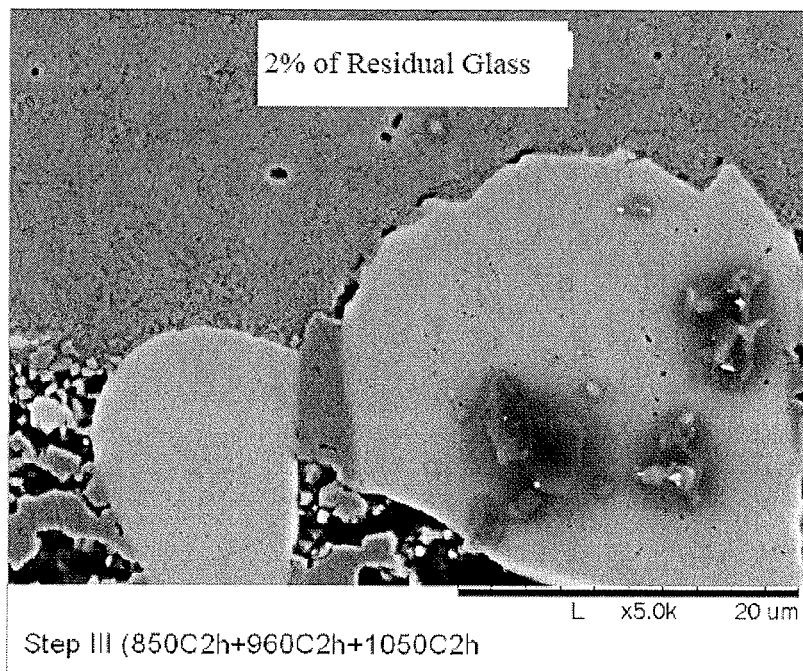
FIG. 6 is an SEM photomicrograph showing a sealant material prepared with a three-step firing process according to an embodiment of the present invention resulting in 2% residual glass.
Figure 7:
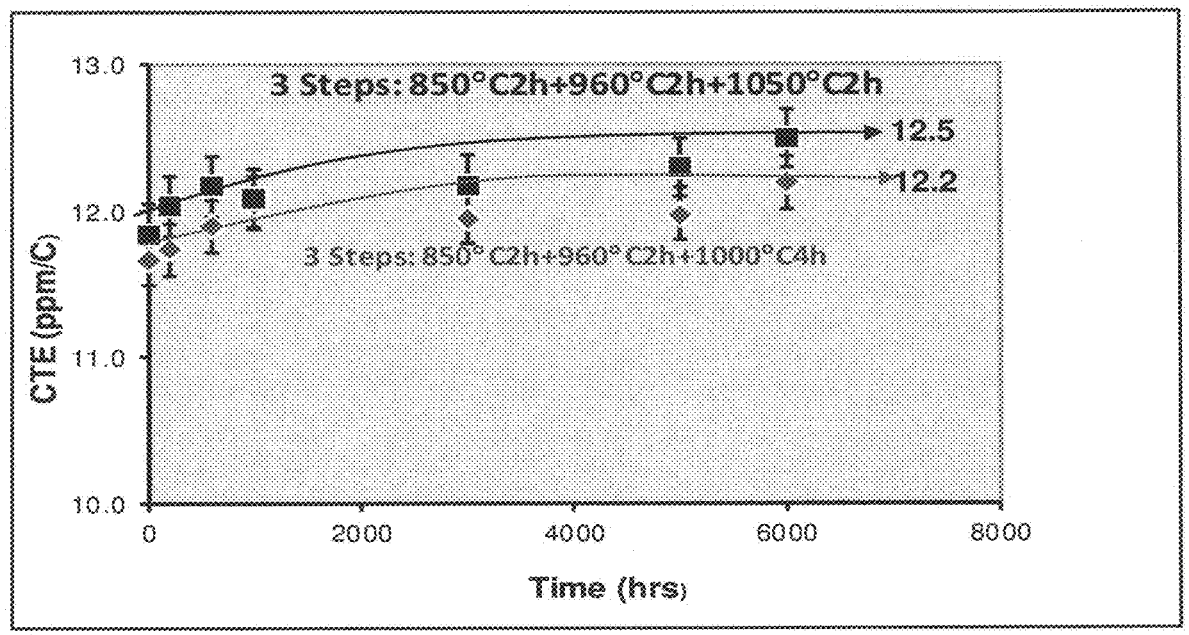
FIG. 7 is a graph illustrating long term thermal stability of seals in accordance with an embodiment formed by two different three-step heating cycles over 6000 hours at 850° C. in air.
Figure 8:
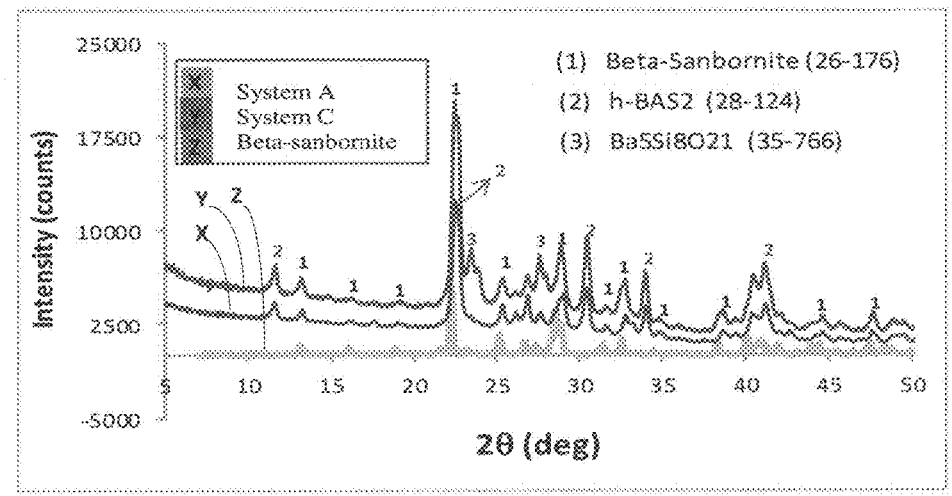
FIG. 8 is a graph illustrating the results of XRD analysis of glasses of system A and system B in accordance with embodiments herein, sealed with three step sintering cycle (850° C.2h+960C2h+1050° C.2h).

Preferred embodiments of the present invention also show a greatly reduced residual glass percentage as compared to prior art seals. A lower residual glass percentage is desirable in that it results in a seal that is more stable over time. For example, FIG. 7 illustrates long term thermal stability for system B sealed with two different three (3) step heating cycles at over 6000 hrs at SOFC operating conditions. FIG. 5 is an SEM photomicrograph showing a prior art seal prepared using a two-step final heating stage in which the sample was heated at 850° C. for 2 hours followed by a final heating stage at 960° C. for two hours. The sealant material and final heating process used to prepare the sample shown in FIG. 5 resulted in a seal having 21% residual glass. In contrast, FIG. 6 shows a seal according to the present invention prepared using the composition of system B (described above) and a final heating profile consisting of an initial sintering heating step at 850° C. for 2 hours, an intermediate crystallization heating step of 960° C. for two hours, and a final crystallization heating step at 1050° C. for two hours. The sealant material and final heating process used to prepare the sample shown in FIG. 6 resulted in a seal having only 2% residual glass. As illustrated in Table 6, prolonging the final heating step at 1050° C. in a three-step heating cycle for an additional two hours (four hours total) resulted in a seal having less than 1% residual glass phase.

Leak Rate Tests

A helium leak rate test as performed on a glass-ceramic disc obtained from glass systems B described above. The disc included a 1-inch (2.54 cm) diameter and was placed in a container with its circumference sealed against the container with a wax seal. A vacuum was applied to one end of the disc from inside the container and helium was provided on the opposite side of the disc and normalized to the area of the disc. The leak tests were performed at room temperature. The leak test result for helium was $5.6 \times 10^{-10}$ mbarL/S cm², which converts to $8.8 \times 10^{-9}$ sccs, and which corresponds to a hydrogen leak rate of $3.3 \times 10^{-9}$ sccs.

Items

Item 1: An ionic transport device component, comprising:
a) a substrate; and
b) a sealing component coating at least a portion of the substrate surface, the sealing component including a barium silicate phase ($Ba_5Si_8O_{21}$ and $Ba3SiO5O13$), a hexa-celsian phase (h-$BaO.Al_2O_3.2SiO_2$ or h-$BAS_2$), and a sanbornite phase ($BaO.2SiO_2$ or $BS_2$), and a residual glass phase, wherein the sealing component has a residual glass phase below about 10 vol % below about 6 vol %, below about 2 vol %, or below about 1 vol %, and a coefficient of thermal expansion of about 11 to 12.8 ppm/° C.

Item 2: An ionic transport device component, comprising:
a substrate; and
a sealing component coating at least a portion of the substrate surface, the sealing component including:
(i) a residual glass phase;
(ii) a barium silicate phase and/or a hexa-celsian phase; and
(iii) a sanbornite phase;
wherein the sealing component has a residual glass phase below about 10 vol %, below about 6 vol %, below about 2 vol %, or below about 1 vol %, and a coefficient of thermal expansion of about 11 to 12.8 ppm/° C.

Item 3: The sealing component of any of the preceding claims, wherein the molar ratio of $SiO_2$:$BaO$ is from about 1:1 to about 4:1, about 1.5:1 and about 2.5:1, or about 2:1.

Item 4: The sealing component of any of the preceding claims, wherein the molar ratio of $SiO_2$:$Al_2O_3$ is from about 3:1 to about 7:1 or from about 4:1 and 6:1.

Item 5: The sealing component of any of the preceding claims, wherein the amount of $SiO_2$ present is in a range of from about 60.0 mol % to about 65.0 mol %.

Item 6: The sealing component of any of the preceding claims, wherein the amount of $Al_2O_3$ present is in a range of from about 4.0 mol % to about 10 mol %.

Item 7: The sealing component of any of the preceding claims, wherein the sealing component has a thickness in a range of from about 1 micron to about 500 microns at room temperature.

Item 8: The sealing component of any of the preceding claims, wherein the sealing component has a thickness in a range of from about 10 microns to about 250 microns at room temperature.

Item 9: The sealing component of any of the preceding claims, wherein the sealing component has a thickness in a range of from about 20 microns to about 100 microns at room temperature.

Item 10: The sealing component of any of the preceding claims wherein the sealing component has a difference between a glass crystallization temperature and a glass transition temperature in a range of from about 200° C. to about 300° C. at a heating rate of about 5° C./min, between about 190° C. and about 250° C. at a heating rate of about 5° C./min, or less than about 200° C. at a heating rate of about 5° C./min.

Item 11: The sealing component of any of the preceding claims wherein the sealing component has a glass stability value (Kgl) in a range between 0.4 and 0.6, in a range between 0.5 and 0.7, greater than 0.4, greater than 0.5, or greater than 0.6.

Item 12: Any of the preceding claims in which the ionic transport device is a solid oxide fuel cell.

Item 13: Any of the preceding claims in which the ionic transport device is an oxygen transport membrane device.

Item 14: A solid oxide fuel cell, comprising:
a) a plurality of sub-cells, each sub-cell including:
  i) a cathode in fluid communication with a source of oxygen gas;
  ii) an anode in fluid communication with a source of a fuel gas; and
  iii) a solid electrolyte between the cathode and the anode; and
b) a seal coating applied to the outer surfaces of the plurality of sub-cells and forming a hermetic seal between the cathode, anode, and electrolyte to separate the fuel gas from the oxygen gas, the seal coating including a barium silicate phase ($Ba_5SiO_8O_{21}$ and $Ba_3Si_5O_{13}$), a hexa-celsian phase (h-$BaO.Al_2O_3.2SiO_2$ or h-BAS2), and a sanbornite phase ($BaO.2SiO_2$ or BS2), and a residual glass phase, wherein the sealing component has a residual glass phase below 10 vol % and a coefficient of thermal expansion (CTE) of about 10.5 to 12.8 ppm/° C., or 11 to 12.2

Item 15: The solid oxide fuel cell of claim 12 having a CTE of about 11 ppm/° C., or about 12.0 to 12.5 ppm/° C.

Item 16: The solid oxide fuel cell of claim [0075] wherein the seal coating has a CTE that is within about 2 ppm/° C. below the CTE of the solid oxide fuel cell, or within about 1 ppm/° C. above the CTE of the solid oxide fuel cell, or within less than 1 ppm/° C. of the CTE of the solid oxide fuel cell.

Item 17: A method of applying seal coating to an ionic transport device comprising the steps of:
a) forming a glass composition that upon heating will form a barium silicate phase ($Ba_5Si_8O_{21}$ and $Ba_3Si_5O_{13}$), a hexa-celsian phase ($BaAl_2SiO_8$), a sanbornite phase ($BaSi_2O_5$), and a residual glass phase;
b) milling the glass composition to produce a glass powder having an average particle size (d50) in a range of between about 500 nm and about 10 μm;
c) mixing the glass powder with a binder and a liquid to form a slurry;
d) coating at least a part of a surface of the ionic transport device with the slurry;
e) forming a seal coating on the ionic transport device having a crystalline structure with a residual glass phase below 10 vol % and a coefficient of thermal expansion (CTE) of about 10.5 to about 12.8 ppm/° C., or about 11 to about 12.2 ppm/° C.

Item 18: The method of claim 15 in which forming a seal coating on the ionic transport device having a crystalline structure comprises sintering the coated ionic transport device and heating the coated ionic transport device to form a seal coating having a crystalline structure.

Item 19: The method of claim 15 wherein sintering the coated ionic transport device comprises sintering the coated ionic transport device at a temperature in a range of between about 800° C. and about 900° C. for a time period in a range of between about 2 to 4 hours.

Item 20: The method of claim 15 wherein heating the coated ionic transport device to form a seal coating having a crystalline structure comprises heating the coated ionic transport device to a temperature of about 900° C. to about 1000° C. for a time period of about 2 to 6 hours.

Item 21: The method of claim 18 further comprising heating the coated ionic transport device to a temperature of about 1000° C. to about 1100° C. for a time period of about 2 to 8 hours to increase the CTE and ratio of L-sanbornite to H-sanbornite, and to reduce the residual glass vol % within the seal coating.

Item 22: The method of claim 18 in which heating the coated ionic transport device to a temperature of about 1000° C. to about 1100° C. for a time period of about 2 to 8 hours results in a coating having a sanbornite concentration of 60 to 90%, 75 to 90%, greater than 75% or greater than 85%.

Item 23: A method of applying seal coating to an ionic transport device comprising the steps of:
forming a glass composition that upon heating will form a barium silicate phase, a hexa-celsian phase, a sanbornite phase, and a residual glass phase;
milling the glass composition to produce a glass powder;
mixing the glass powder with a binder and a liquid to form a slurry;
coating at least a part of a surface of the ionic transport device with the slurry; and
forming a seal coating on the ionic transport device by
  (i) sintering the coated ionic transport device in an initial heating step above the glass transition temperature but below the glass crystallization onset temperature of the sealing material;
  (ii) crystallizing the seal coating by heating the coated ionic transport device to a first crystallization temperature above the glass crystallization onset temperature but far enough below the melting point of the sealing material that no melting of the seal material takes place; and
  (iii) completing the crystallization of the seal coating by heating the coated ionic transport device to a final crystallization temperature above the first crystallization temperature and slightly below the melting temperature of the sealing material.

Item 24: The method of claim [0083] in which sintering the coated ionic transport device comprises sintering the coated ionic transport device and heating the coated ionic transport device to form a seal coating having a crystalline structure.

Item 25: The method of any of claims [0083]-[0084] wherein sintering the coated ionic transport device comprises sintering the coated ionic transport device at a temperature in a range of between about 800° C. and about 900° C. for a time period in a range of between about 2 to 4 hours.

Item 26: The method of any of claims [0083]-[0085] wherein heating the coated ionic transport device to a first crystallization temperature comprises heating the coated ionic transport device to a temperature of about 900° C. to about 1000° C. for a time period of about 2 to 6 hours.

Item 27: The method of any of claims [0083]-[0086] wherein heating the coated ionic transport device to a final crystallization temperature comprises heating the coated ionic transport device to a temperature of about 1000° C. to about 1100° C. for a time period of about 2 to 8 hours to increase the CTE and ratio of L-sanbornite to H-sanbornite, and to reduce the residual glass vol % within the seal coating.

Item 28: The method of any of claims [0083]-[0087] in which heating the coated ionic transport device to a temperature of about 1000° C. to about 1100° C. for a time period of about 2 to 8 hours results in a coating having a sanbornite concentration of 60 to 90%, 75 to 90%, greater than 75% or greater than 85%.

Item 29: The method of any of claims [0083]-[0088] further comprising one or more additional crystallization heating steps before the step of completing the crystallization of the seal coating by heating the coated ionic transport device to a final crystallization temperature.

Item 30: The method of any of claims 15-[0089] in which the ionic transport device is a solid oxide fuel cell.

Item 31: The method of any of claims 15-[0089] in which the ionic transport device is an oxygen transport membrane device.

Although the seals structures and methods of the present invention are described below with respect to a solid oxide fuel cell, it should be understood that the same or similar seal structures and methods can be used in other applications where a need exists to seal a ceramic sheet to a support frame. Seal material and methods described herein can also be used to form a bond between two structures, materials, or substrates having a high CTE (for example greater than about 10 ppm/° C.). For example, a glass seal layer according to the present invention could be used to form a bond between a SOFC stack and a manifold that will deliver gas to the stack. Glass seal material according to the present invention could also be used to bond a variety of high-CTE materials for non-SOFC applications, including bonding ceramics, metals, metal-ceramics with potential applications in electrochemical systems, structural applications, etc. For some non-SOFC applications, the seal provided by the glass seal material according to the present invention can be a non-hermetic seal.

The present invention has broad applicability and can provide many benefits as described and shown in the examples above. The embodiments will vary greatly depending upon the specific application, and not every embodiment will provide all of the benefits and meet all of the objectives that are achievable by the invention. Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

As used herein, the terms "seal," "sealant," and "sealing" are used interchangeably to refer to cured or un-cured materials according to embodiments of the invention described herein and their equivalents. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present). Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method of forming a seal, comprising:
   placing a seal material in contact with at least a portion of an ionic transport device,
   wherein the seal material has a glass transition temperature and a glass crystallization onset temperature;
   applying a first heat to the seal material;
   applying a second heat to the seal material such that a crystallized phase is formed;
   applying a third heat after the second heat; and
   forming the seal comprising a barium silicate phase comprising a first formulation, a sanbornite phase comprising a second formulation, wherein the first formulation is different than the second formulation and a content of a residual glass phase of not greater than 5.9 vol %, wherein the seal has a coefficient of thermal expansion in a range of 11.7 to 12.8 ppm/° C.,
   wherein the ionic transport device comprises a first component comprising a ceramic material, and the seal is bonded to a surface of the first component.

2. The method of claim 1, wherein the first heat is performed at a temperature that is greater than the glass transition temperature and less than the glass crystallization onset temperature.

3. The method of claim 1, wherein the first heat is sufficient to sinter the seal material.

4. The method of claim 1, wherein the second heat is performed at a temperature of at least the glass crystallization onset temperature.

5. The method of claim 1, wherein the third heat is performed at a temperature of at least 1000° C.

6. The method of claim 1, wherein the third heat is performed at a temperature higher than the first heat, the second heat, or both.

7. The method of claim 1, further comprising applying a fourth heat to the seal material, wherein the fourth heat is performed at a temperature that is higher than the third heat.

8. The method of claim 1, wherein applying the second heat is performed at least 2 hours and not greater than 8 hours.

9. The method of claim 1, wherein the seal material comprises $SiO_2$, $Al_2O_3$, and BaO.

10. The method of claim 1, wherein the first component comprises an oxygen transport membrane.

11. The method of claim 1, wherein the seal comprises a residue glass phase below 2 vol %.

12. An ionic transport device, comprising:
    a first component comprising a ceramic material; and
    a seal bonded to a surface of the first component, wherein the seal includes a barium silicate phase comprising a first formulation, a sanbornite phase comprising a second formulation, wherein the first formulation is different than the second formulation and a content of a residual glass phase of not greater than 5.9 vol %,
    wherein the seal has a coefficient of thermal expansion in a range of 11.7 to 12.8 ppm/° C.

13. The ionic transport device of claim 12, wherein the seal further comprises a hexa-celsian phase.

14. The ionic transport device of claim 12, wherein the residual glass phase is not greater than 2 vol %.

15. The ionic transport device of claim 12, wherein the seal has a molar ratio of $SiO_2$:BaO between 1:1 and 4:1.

16. The ionic transport device of claim 12, wherein the seal comprises $SiO_2$ in an amount from 60.0 mol % to 65.0 mol %.

17. The ionic transport device of claim 12, wherein the seal comprises $Al_2O_3$ in an amount from 4 mol % to 10 mol %.

18. The ionic transport device of claim 12, wherein the first component comprises an oxygen transport membrane.

19. A solid oxide fuel cell, comprising:
    a cathode;
    an anode;
    an electrolyte between the cathode and the anode; and
    a hermetic seal bonded to an outer surface of the solid oxide fuel cell,
    wherein:
    the seal comprises a barium silicate phase comprising a first formulation, a sanbornite phase comprising a second formulation, wherein the first formulation is different than the second formulation and a content of a residual glass phase below 5.9 vol %; and
    the seal has a coefficient of thermal expansion in a range from 11.7 to 12.8 ppm/° C.

20. The solid oxide fuel cell of claim 19, wherein the first formulation comprises $Ba_5Si_8O_{21}$ and $Ba_3Si_5O_{13}$.

* * * * *